Patented July 15, 1952

2,603,642

UNITED STATES PATENT OFFICE 2,603,642

METHINE DYESTUFFS

Harry Derek Edwards, London, and John David Kendall, Ilford, England, assignors to Ilford Limited, Ilford, England, a British company No Drawing. Original application January 15, 1948, Serial No. 2,554. Divided and this application August 28, 1950, Serial No. 181,942. In Great Britain January 24, 1947

3 Claims. (Cl. 260—240)

This invention relates to the production of new organic compounds which are valuable photographic sensitising dyes, and is divided from application Serial No. 2,554 filed January 15, 1948, now Patent No. 2,533,233.

According to application Serial No. 2,554 compounds of the general Formula I:

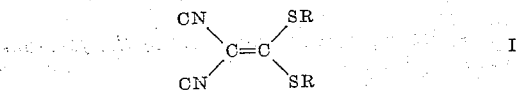

where R as an alkyl or aralkyl group are prepared by reacting carbon disulphide with the dry alkali-metal derivative of malodinitrile and alkylating or aralkylating the product with an alkyl or aralkyl salt or ester.

These compounds may be referred to as $\beta\beta$-dicyano ketene dialkyl- or diaralkyl-mercaptoles.

The reaction with carbon disulphide can conveniently be effected with the malodinitrile in suspension in diethyl ether, though other inert solvents can be used. As alkali-metal, metallic sodium is the most convenient to use. Alkylation may be effected, for example, with methyl, ethyl and higher alkyl halides and the iodides are particularly suitable. Other alkylating agents which may be used are dialkyl sulphates, e. g. dimethyl sulphate and diethyl sulphate, alkyl p-toluene sulphonates, e. g. methyl or ethyl p-toluene sulphonates, or alkylene dihalides, e. g. ethylene dibromide and trimethylene dibromide. The alkyl group of the alkylating agent may be substituted so that other alkylating agents which may be used are chloracetic esters. Aralkylating agents are benzyl halides or sulphates.

The reaction with the carbon disulphide is best effected by allowing the reagents to stand together at room temperature and the alkylation or aralkylation is best effected by warming the reagents together.

According to this invention a compound of general Formula I is reacted with an alkyl or aralkyl quaternary salt of a five-membered or six-membered heterocyclic nitrogen compound containing a reactive methylene group in $\alpha$ or $\gamma$ position to the heterocyclic nitrogen atom, i. e. with a compound of the general Formula II:

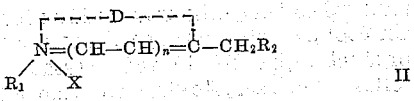

In this formula $R_1$ represents an alkyl or aralkyl group, e. g. methyl, ethyl, propyl, butyl or higher alkyl containing from 5 to 18 carbon atoms, benzyl and naphthylmethyl, $R_2$ represents a hydrogen atom or a hydrocarbon group, e. g. an alkyl or aralkyl group such as any of those listed in respect of $R_1$, or an aryl group such as phenyl or naphthyl, X represents an acid radicle, e. g. halide (chloride, bromide or iodide), sulphate, perchlorate or p-toluene sulphonate, D represents the residue of a five-membered or six-membered heterocyclic nitrogen ring, and $n$ is nought or 1. Typical ring systems which may be present are thiazole, oxazole, selenazole and the polycyclic members of these series, e. g. benzthiazole, benzoxazole and benzselenazole, thiazoline, selenazoline, oxazoline, pyridine, quinoline, lepidine and indolenine.

The reaction takes place with the elimination of the elements HX and RSH yielding products of the general Formula III:

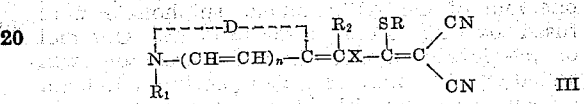

The reaction with the quaternary salt of the heterocyclic nitrogen compound is preferably effected in the presence of a base, e. g. pyridine, diethylamine, triethylamine or sodium acetate in ethyl alcohol.

The dyestuffs of general Formula III are sensitising dyes for photographic silver halide emulsions, and this invention includes silver halide photographic emulsions and particularly silver chloride, silver bromide, silver chlorobromide and silver iodobromide emulsions containing the said dyestuffs.

The following examples illustrate the invention:

EXAMPLE 1

*Preparation of the compound of the formula*

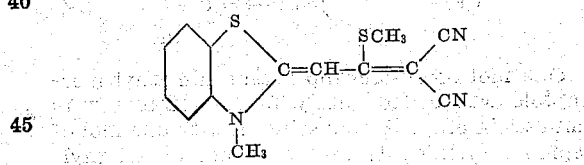

8.5 gms. of $\beta\beta$-dicyano ketene diethyl mercaptole was fused at 100° C. for 2 hours with 7.5 gms. of 1-methyl benzthiazole and 9.3 gms. of methyl p-toluene sulphonate. Ten cc. of pyridine was added and the mixture boiled under reflux for 12 minutes. On pouring the reaction mixture into water the desired product separated. It was filtered off and recrystallised from methyl alcohol as shining purple crystals, M. Pt. 201° C., giving a bright yellow solution in alcohol.

The dyestuff, incorporated in a gelatino silver iodobromide emulsion, extends the sensitivity of the emulsion to about 5500Å., with a maximum sensitivity at about 5300 A.

EXAMPLE 2

*Preparation of the compound of the formula*

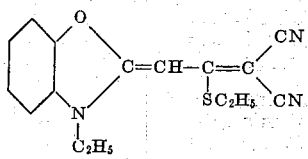

2.5 mols of 2-methyl-benzoxazole ethiodide were boiled gently under reflux for 15 minutes in ethyl alcohol solution with 2½ mols of ββ-dicyano ketene diethyl mercaptole and 5 mols of triethylamine. On dilution with water the dye precipitated and on recrystallisation from methyl alcohol it was obtained as red crystals, M. Pt. 151° C.

EXAMPLE 3

*Preparation of the compound of the formula*

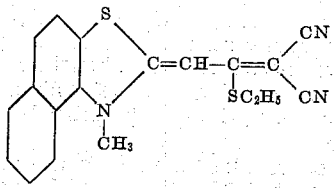

One mol of 2-methyl-β-naphthathiazole and one mol of methyl p-toluene sulphonate were fused together at 100° C. for 15 hours. One mol of ββ-dicyano ketene diethyl mercaptole was added and the mixture boiled gently for half an hour under reflux with ethyl alcohol and one mol of triethylamine. On pouring the reaction mixture into water the required dyestuff was precipitated. After separation and recrystallisation from ethyl alcohol it was obtained as crystals melting at 220° C.

This dyestuff was incorporated in a gelatino silver iodobromide emulsion and imparted a band of sensitivity extending to about 5900 Å. with a maximum at about 5500 A.

EXAMPLE 4

*Preparation of the compound of the formula*

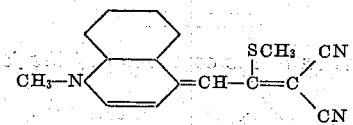

One mol of ββ-dicyano ketene dimethyl mercaptole was boiled gently under reflux for 10 minutes in ethyl alcohol solution with one mol of lepidine methiodide and one mol of triethylamine. The mixture became a bright magenta colour and on dilution with water the required dyestuff precipitated out. On recrystallisation from benzene the dye was obtained as red needles with the blue reflex, M. Pt. 221° C.

This dyestuff, when incorporated in a gelatino silver iodobromide emulsion, imparts a band of sensitivity extending to 5900 Å.

EXAMPLE 5

*Preparation of the compound of the formula*

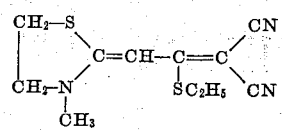

One mol each of ββ-dicyano ketene diethyl mercaptole, 2-methylthiazoline and methyl p-toluene sulphonate were fused together at 100° C. for two hours. The mixture became yellow, ethyl alcohol was added and the whole boiled gently under reflux for 20 minutes with one mol of triethylamine. The reaction mixture was then carefully diluted and allowed to stand for several hours during which the dyestuff crystallised out in long needles. On recrystallisation from methyl alcohol it was obtained as crystals melting at 161° C.

This dyestuff, when incorporated in a gelatino silver iodobromide emulsion, imparts a band of sensitivity extending to about 5300 Å. with a maximum at about 4700 Å.

EXAMPLE 6

*Preparation of the compound of the formula*

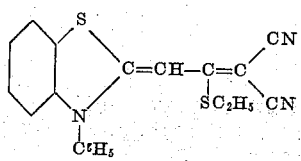

One mol of 2-methyl benzthiazole ethiodide was boiled gently under reflux for 15 minutes in ethyl alcohol with one mol of ββ-dicyano ketene diethyl mercaptole and 2 mols of triethylamine. On dilution with water an oil separated and then hardened to give crystals of the product which, on recrystallisation from methyl alcohol, was obtained as mauve crystals with a green reflex, M. Pt. 164° C.

This dyestuff, when incorporated in a gelatino silver iodobromide emulsion, imparts a band of sensitivity extending to 5500 Å. with a maximum at 5000 Å.

EXAMPLE 7

*Preparation of the compound of the formula*

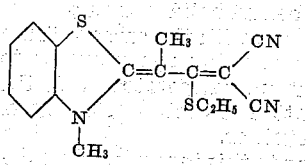

One mol each of ββ-dicyano ketene diethyl mercaptole, 2-ethyl benzthiazole and methyl p-toluene sulphonate were fused together at 100° C. for 2 hours, the mixture becoming deep orange. A small amount of ethyl alcohol and one mol of triethylamine were added and the mixture boiled gently under reflux for 15 minutes. On cooling and diluting with water the required product separated in red crystals with a gold reflex. On recrystallisation from ethyl alcohol, in which the product is only moderately soluble, the crystals of the product melting at 187° C. were obtained.

What we claim is:

1. Process for the production of dyestuffs which comprises reacting a ββ-dicyano ketene dialkyl mercaptole of the general formula:

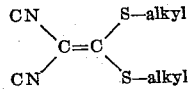

with a compound of the general formula:

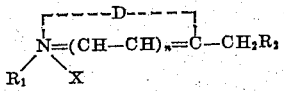

where $R_1$ is selected from the class consisting of alkyl and aralkyl groups and $R_2$ is selected from the class consisting of the hydrogen atom and hydrocarbon groups.

2. Process for the production of dyestuffs which comprises reacting a ββ-dicyano ketene dialkyl mercaptole of the general formula:

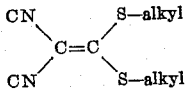

with a compound of the general formula:

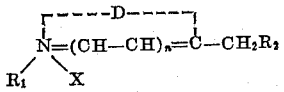

where $R_1$ is selected from the class consisting of alkyl and aralkyl groups and $R_2$ is selected from the class consisting of the hydrogen atom and hydrocarbon groups, in the presence of a basic condensing agent.

3. A dyestuff of the general formula:

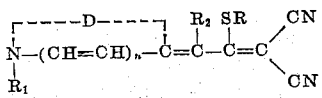

where R and $R_1$ are each selected from the group consisting of alkyl and aralkyl groups, $R_2$ is selected from the group consisting of the hydrogen atom and hydrocarbon groups, D is the residue of a heterocyclic nitrogen nucleus and $n$ is selected from nought and 1.

HARRY DEREK EDWARDS.
JOHN DAVID KENDALL.

REFERENCES CITED

The following references are of record in the file of this patent:

UNITED STATES PATENTS

| Number | Name | Date |
|---|---|---|
| 2,166,736 | White et al. | July 18, 1939 |
| 2,263,749 | White et al. | Nov. 25, 1941 |
| 2,320,654 | Riester | June 1, 1943 |
| 2,322,015 | Hamer et al. | June 15, 1943 |
| 2,338,782 | Riester | Jan. 11, 1944 |
| 2,340,882 | Kendall | Feb. 8, 1944 |
| 2,353,164 | Kendall et al. | July 11, 1944 |

OTHER REFERENCES

Chemical Abstracts 16:3101 (Abstract of Brit. Med. Journal, 1922, I 514–515).

Chemical Abstracts 19:530 (Abstract of Proc. Roy. Soc., London, 96B 317–333, 1924).